(12) United States Patent
Cudak et al.

(10) Patent No.: US 9,310,929 B2
(45) Date of Patent: Apr. 12, 2016

(54) UNLOCKING TOUCH SCREEN DEVICES

(71) Applicant: Lenovo Enterprise Solutions (Singapore) Pte. Ltd., Singapore (SG)

(72) Inventors: Gary D. Cudak, Wake Forest, NC (US); Christopher J. Hardee, Raleigh, NC (US); Sarbajit K. Rakshit, Kolkata (IN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 46 days.

(21) Appl. No.: 14/298,029

(22) Filed: Jun. 6, 2014

(65) Prior Publication Data

US 2015/0355773 A1 Dec. 10, 2015

(51) Int. Cl.
| | |
|---|---|
| *G06F 3/048* | (2013.01) |
| *G06F 3/041* | (2006.01) |
| *G06F 3/01* | (2006.01) |
| *G06F 21/36* | (2013.01) |
| *G06F 3/0484* | (2013.01) |
| *G06F 3/0481* | (2013.01) |
| *G06F 3/0488* | (2013.01) |

(52) U.S. Cl.
CPC .............. *G06F 3/0416* (2013.01); *G06F 3/017* (2013.01); *G06F 3/04817* (2013.01); *G06F 3/04842* (2013.01); *G06F 3/04883* (2013.01); *G06F 21/36* (2013.01)

(58) Field of Classification Search
CPC ... G06F 3/0488; G06F 3/04897; G06F 3/062; G06F 3/0622
USPC ........................................................ 345/173
See application file for complete search history.

(56) References Cited

U.S. PATENT DOCUMENTS

| | | | |
|---|---|---|---|
| 6,509,847 B1 | 1/2003 | Anderson | |
| 8,385,885 B2 | 2/2013 | Hainzl | |
| 8,577,356 B2 | 11/2013 | Kornilovsky et al. | |
| 8,587,542 B2 | 11/2013 | Moore | |
| 2005/0110777 A1* | 5/2005 | Geaghan | G06F 3/042 345/179 |
| 2012/0289201 A1 | 11/2012 | Ding | |
| 2013/0069893 A1* | 3/2013 | Brinda | G06F 3/0488 345/173 |
| 2013/0106731 A1* | 5/2013 | Yilmaz | G06F 3/0346 345/173 |
| 2013/0176247 A1* | 7/2013 | Jogo | G06F 3/041 345/173 |

(Continued)

FOREIGN PATENT DOCUMENTS

| | | |
|---|---|---|
| EP | 2487621 A1 | 8/2012 |
| WO | 2012109368 A1 | 8/2012 |
| WO | 2012166279 A1 | 12/2012 |

OTHER PUBLICATIONS

Anonymous, "System and Method to Unlock Screen Based on Finger Pressure", ip.com, IPCOM000220614D, Aug. 9, 2012, pp. 1-5.

(Continued)

*Primary Examiner* — Kumar Patel
*Assistant Examiner* — Vinh Lam
(74) *Attorney, Agent, or Firm* — Law Office of Jim Boice

(57) ABSTRACT

A method, system, and/or computer program product unlocks an electronic device that has a touchscreen. Multiple tactile inputs to a touchscreen on a locked electronic device are detected. A distance between the most distant tactile inputs is detected, and a relative position, as measured from the most distant tactile inputs, of other tactile inputs to the touchscreen is calculated. In response to the relative position of the other detected tactile inputs matching a stored positioning file for touchscreen tactile inputs, the electronic device is unlocked.

20 Claims, 5 Drawing Sheets

(56) References Cited

U.S. PATENT DOCUMENTS

| | | |
|---|---|---|
| 2013/0176249 A1 | 7/2013 | Wang |
| 2013/0285982 A1 | 10/2013 | Graumann et al. |
| 2013/0321305 A1* | 12/2013 | Liang ................. G06F 3/04883 345/173 |
| 2014/0053108 A1 | 2/2014 | Johansson |
| 2014/0192028 A1* | 7/2014 | Leydon ............... G06F 3/03545 345/179 |
| 2014/0267120 A1* | 9/2014 | Zhang ................. G06F 3/0484 345/173 |
| 2015/0040243 A1* | 2/2015 | Mittal .................. G06F 21/604 726/27 |
| 2015/0205479 A1* | 7/2015 | Zhu ...................... G06F 3/0488 715/863 |

OTHER PUBLICATIONS

Anonymous, "System and Method for Touch-Based Authentication of Mobile Device (Focus Area: Human Interaction)", ip.com, IPCOM000216054D, Mar. 21, 2012, pp. 1-5.

S. Azenkot et al., "Passchords: Secure Multi-Touch Authentication for Blind People", ACM, Assets'12, Oct. 22-24, 2012, pp. 159-166.

* cited by examiner

| ICON | FINGER CONTACT | DURATION (SECONDS) |
|---|---|---|
| ☺ | ━ | 0.10 < t < 0.5 |
| ☀ | ● | 0.5 < t < 1.0 |
| ★ | ⬭ | 0.75 < t < 1.5 |
| ☾ | ⬬ | 1.0 < t < 2.0 |
| ✺ | ( ( ● ) ) | 1.0 < t < 2.5 |
| ♡ | ● → ● | 2.0 < t < 3.0 |

FIG. 4

UNLOCKING TOUCH SCREEN DEVICES

BACKGROUND

The present disclosure relates to the field of electronic devices, and specifically to electronic devices that have touch screens. Still more particularly, the present disclosure relates to unlocking electronic devices through inputs to their touch screens.

Electronic devices, such as gaming devices, tablet computers, smart phones, etc. often come equipped with touch screens. A touch screen is an input/output device that allows a user to see displayed information (output), as well as to input information by tactile inputs, from fingers, styli, etc. (input). The touch screen is often able to detect where the tactile input is placed due to a coordinate mapping system, which tells the electronic device where the user is touching the touch screen. Thus, the combined input/output nature of touch screens allows a user to use the touch screen as a keyboard, a keypad, etc.

SUMMARY

A method, system, and/or computer program product unlocks an electronic device that has a touchscreen. Multiple tactile inputs to a touchscreen on a locked electronic device are detected. A distance between the most distant tactile inputs is detected, and a relative position, as measured from the most distant tactile inputs, of other tactile inputs to the touchscreen is calculated. In response to the relative position of the other detected tactile inputs matching a stored positioning file for touchscreen tactile inputs, the electronic device is unlocked.

BRIEF DESCRIPTION OF THE SEVERAL VIEWS OF THE DRAWINGS

FIG. 4 is a table of finger contact directives and durations provides by visual cues on a touchscreen.

DETAILED DESCRIPTION

Figure 1:
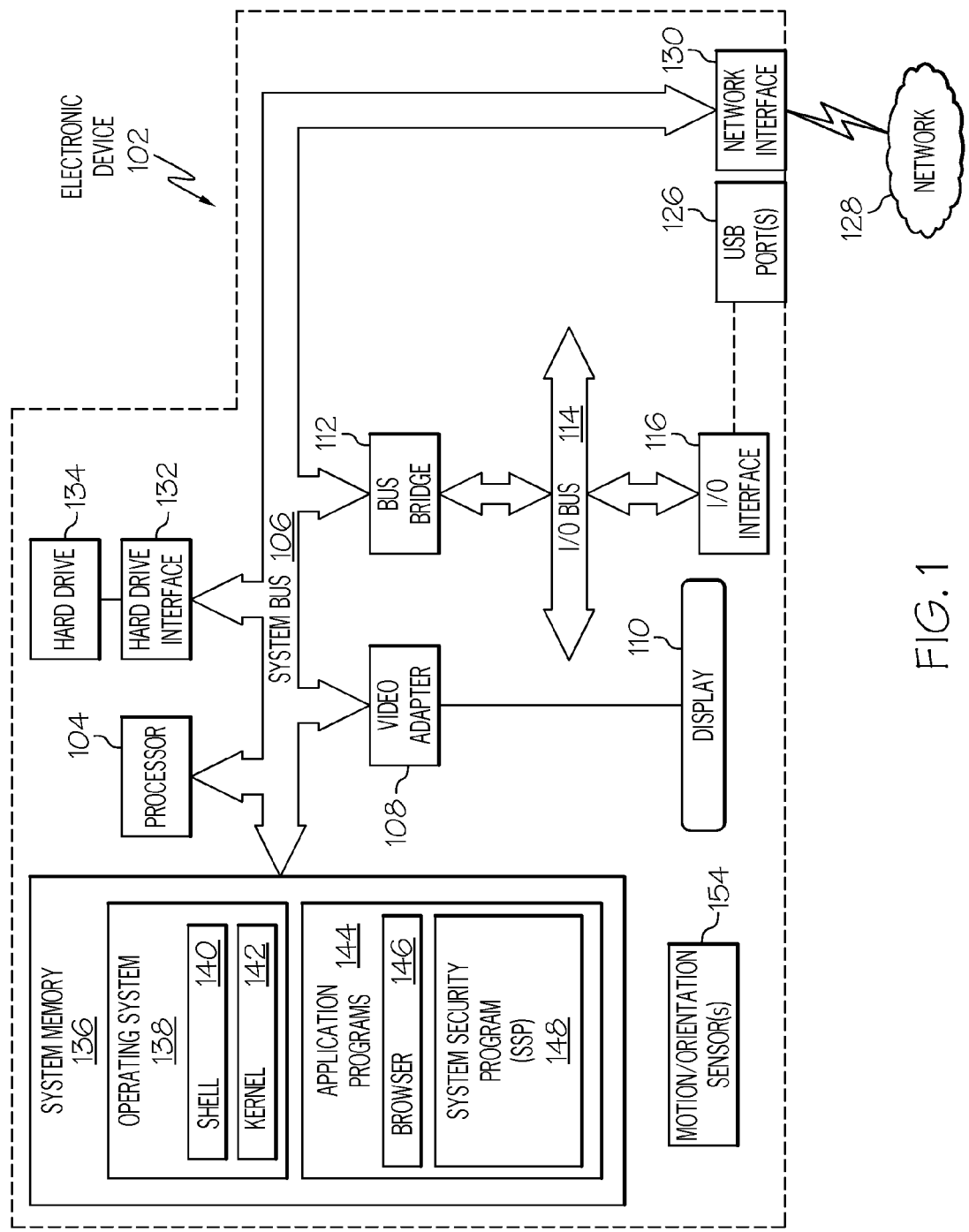
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention.

Exemplary electronic device 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including external USB port(s) 126.

As depicted, electronic device 102 is able to communicate with other electronic devices and/or computers and/or servers using a network interface 130. Network interface 130 is a hardware network interface, such as a network interface card (NIC), etc. Network 128 may be an external network such as the Internet, or an internal network such as an Ethernet or a virtual private network (VPN), or a wireless local area network (WLAN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in electronic device 102. This volatile memory includes additional higher levels of volatile memory (not shown), including, but not limited to, cache memory, registers and buffers. Data that populates system memory 136 includes electronic device 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., electronic device 102) to send and receive network messages to the Internet using hypertext transfer protocol (HTTP) messaging, thus enabling communication with other computer systems.

Application programs 144 in electronic device 102's system memory also include a System Security Program (SSP) 148. SSP 148 includes code for implementing the processes described below, including those described in FIGS. 2-5.

Note that the hardware elements depicted in electronic device 102 are not intended to be exhaustive, but rather are representative to highlight essential components required by the present invention. For instance, electronic device 102 may include alternate memory storage devices such as magnetic cassettes, digital versatile disks (DVDs), Bernoulli cartridges, and the like. These and other variations are intended to be within the spirit and scope of the present invention.

Figure 2:
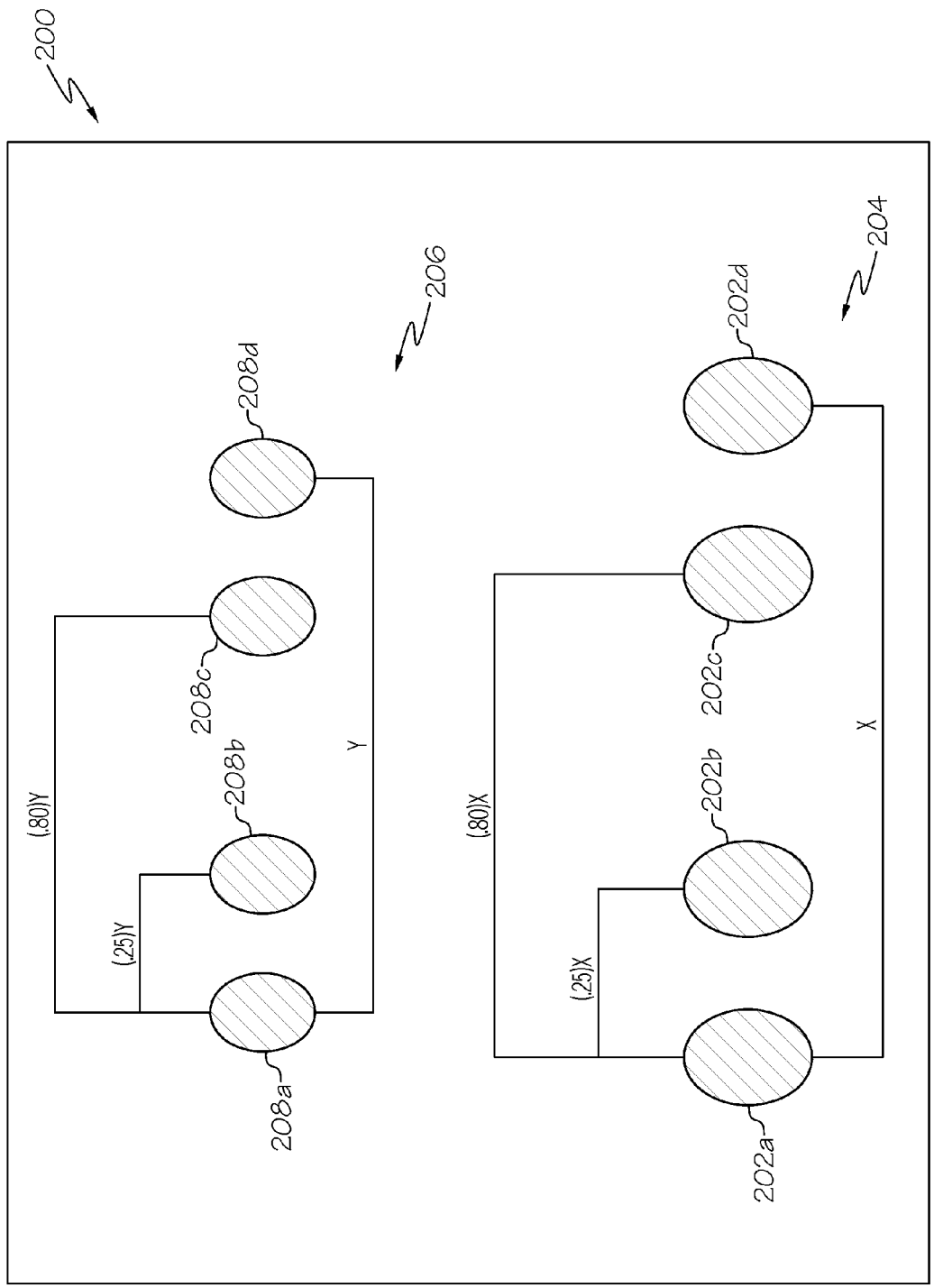
FIG. 2 illustrates an exemplary touchscreen in which two sets of tactile inputs are being input.

With reference now to FIG. 2, an exemplary touchscreen 200 is presented. Touchscreen 200 is part of an electronic device that is initially in a locked state. That is, the locked electronic device requires a user-provided unlock signal (e.g., to the touchscreen 200) before accepting any other inputs to the touchscreen. Two exemplary sets of tactile inputs are depicted: tactile input set 204 and tactile input set 206. A tactile input is defined as a physical touching of a touchscreen. While tactile inputs may be from a stylus, pen, or other mechanical device, in one or more embodiments of the present invention tactile inputs are finger/thumb touches by a user.

Consider now the tactile inputs 202a-202d in tactile input set 204. In one embodiment of the present invention, the tactile inputs 202a-202d are simultaneous, such that they are all occurring at the same time, even if they did not originally commence at the exact same time. That is, one or more of the tactile inputs 202a-202d may have initially occurred at different times, but ultimately all of the tactile inputs 202a-202d are occurring at the same time (e.g., all fingers are on the touchscreen 200 at the same time, even if they arrived at different times).

Note that tactile input set 204 includes two tactile inputs 202*a* and 202*d* that are the farthest apart from one another. That is, no two tactile inputs from tactile inputs 202*a*-202*d* are farther apart from each other than tactile inputs 202*a* and 202*d*. Thus, tactile inputs 202*a* and 202*d* are identified as the "most distant tactile inputs".

The total physical distance between tactile input 202*a* and tactile input 202*d* are represented in FIG. 2 as the value "X". As depicted, tactile input 202*b* is at a distance that is one-fourth of "X" ((0.25)X) from tactile input 202*a*, and tactile input 202*c* is at a distance that is eight-tenths of "X") ((0.80) X) from tactile input 202*a*.

Consider now tactile input set 206, which includes tactile inputs 208*a*-208*d*. The physical distance from tactile input 208*a* to the most distant tactile input 208*d* is shown as the distance "Y". Note that the physical distance from tactile input 208*a* to tactile input 208*b* is one-fourth of "Y" ((0.25) Y), and the physical distance from tactile input 208*a* to tactile input 208*c* is eight-tenths of "Y" ((0.80)Y). Since these relative distances (0.25 and 0.80) are the same for both of the tactile input sets 204 and 206, then they are deemed to be equivalent. That is, the positioning of the interior tactile inputs (e.g., 202*b*/202*c* and/or 208*b*/208*c*) are not based on their absolute physical distances between one another, but rather their relative (e.g., percentage of X/Y) distances from one or both of the outer tactile inputs (e.g., 202*a*/208*a* and/or 202*d*/208*d*).

Relative positions of tactile inputs needed to unlock the electronic device are stored in a positioning file for touchscreen tactile inputs. That is, the positioning file stores the relative positions of the tactile inputs that must be used in order to unlock the electronic device. In one embodiment, this positioning file is generated by a user first touching the touchscreen 200. In one embodiment, the user's initial touching of the touchscreen 200 (e.g., by four fingers from one of his hands) will be in a position that is natural for that user. For example, most users may naturally touch the touchscreen with four fingers that are evenly spaced apart. However, the user who presents the tactile input patterns shown in FIG. 2 may have broken his/her two middle fingers in the past, resulting in the splayed positions depicted in both tactile input set 204 as well as tactile input set 206. Even if the user holds his fingers closer together (e.g., as depicted in tactile input set 206), the finger splay that is unique for this user will still be captured. Therefore, if the user initially presented the relative positions of his finger touches as shown in FIG. 2, then this splayed pattern is stored as an unlocking pattern in the positioning file. When the user wants to unlock the electronic device at a later date, then the placement of his fingers in the same relative splayed positions, regardless of how far apart the outer fingers are, will be detected and matched to the original pattern provided by that user. This matching will cause the electronic device to be unlocked (i.e., such that other inputs can now be made via the touchscreen 200).

Figure 3:
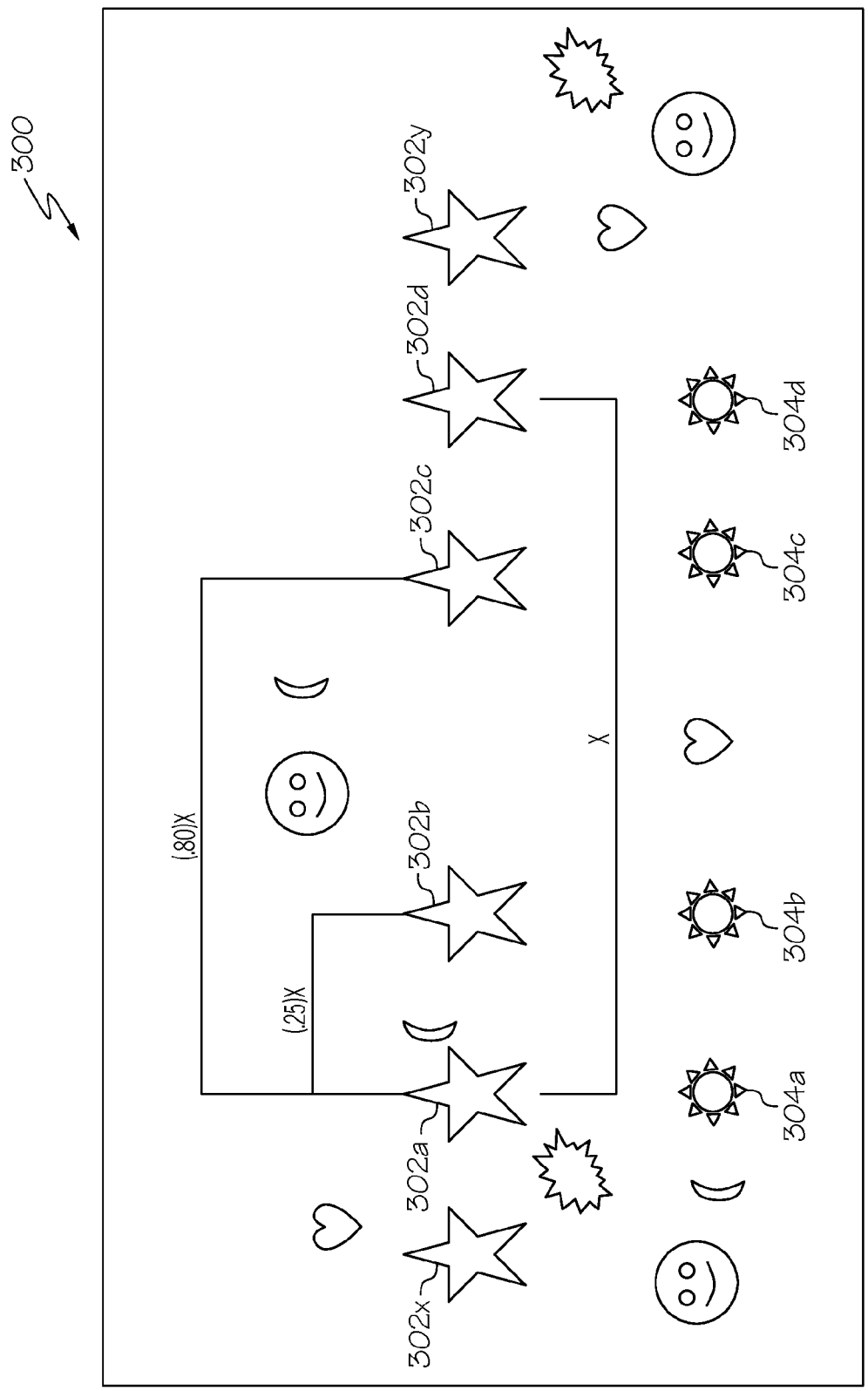
FIG. 3 depicts an exemplary touchscreen that provides stochastically generated visual cues and visual misdirections to a user.

With reference now to FIG. 3, an exemplary touchscreen 300 that provides (in one embodiment, stochastically/randomly generated) visual cues and visual misdirection cues to a user is presented. Consider the visual cues 302*a*-302*d*, which are shown as stars, and which correspond to the finger splay pattern of tactile input set(s) 204/206 shown in FIG. 2. In one embodiment of the present invention, these stars (visual cues 302*a*-302*d*) appear before the user places his fingers on the touchscreen 300, thus directing the user on where to place his fingertips. In another embodiment of the present invention, however, these stars (visual cues 302*a*-302*d*) appear only after the user places his fingertips on the touchscreen 300.

With respect to a first embodiment, assume that stars (visual cues 302*a*-302*d*) appear before the user places his fingers on the touchscreen 300, thus directing the user on where to place his fingertips. If the user places his fingers on these stars (visual cues 302*a*-302*d*), then the electronic device will be unlocked.

Note that there are also visual misdirection cues presented on touchscreen 300, including visual images (icons) of hearts, moons, etc. If a user touches these misdirection cues instead of the stars (visual cues 302*a*-302*d*), then the electronic device will remain locked (in one embodiment, permanently until a system administrator overrides the lockout).

Note that some of the visual misdirection cues (i.e., the suns depicted by visual misdirection cues 304*a*-304*d*) have the same finger-splay orientation as the stars (proper visual cues 302*a*-302*d*). Assume that the electronic device requires that stars (visual cues 302*a*-302*d*), not suns (visual misdirection cues 304*a*-304*d*), be touched in order to unlock the electronic device. The user must know (based on an earlier setup) to place his fingers on the stars (visual cues 302*a*-302*d*), not the suns (visual misdirection cues 304*a*-304*d*). That is, when setting up the unlocking pattern, the user may select (e.g., from a drop-down menu) during setup that stars are the authorizing shapes that he is to touch on the touchscreen in order to unlock the electronic device.

With respect to a second embodiment, assume that the user can place his fingers anywhere on the touchscreen 200 in order to unlock the electronic device (assuming that the splay pattern is proper, as described above). In this second embodiment, however, proper visual cues are presented to the user only where he has placed his fingers. That is, assume that the user has placed his fingers on the touchscreen 300 at the positions shown by the stars (visual cues 302*a*-302*d*). In this embodiment, the stars do not tell the user where to place his fingers, but rather how to contact the touchscreen 300 with his fingers and/or for how long. For example, consider table 400 shown in FIG. 4.

Table 400 in FIG. 4 is a table of finger contact directives and durations that are provided by visual cues on a touchscreen. For example, consider the first icon ("smiling face"). If this is a legitimate visual cue (e.g., part of the visual cues 302*a*-302*d* described in FIG. 3), then the finger contact must be of the fingernails (see the narrow oval shape in the "Finger contact" column), and/or for a duration between 0.10 and 0.5 seconds in order to be recognized by the unlocking mechanism on the electronic device. Similarly, if the icon is a sun, then the finger contact must be a fingertip (as described by the larger oval shape), and/or held between 0.5 and 1.0 seconds. If the icon is a star, then the finger contact must be a fingerprint (as described by the longer oval shape), and/or held between 0.75 and 1.5 seconds. If the icon is a moon, then the finger contact must be a side of a finger (as described by the wider oval shape), and/or held between 1.0 and 2.0 seconds. If the icon a starburst, then the finger contact must be of a vibrato motion (rocking back and forth), and/or held between 1.0 and 2.5 seconds. If the icon is a heart, then the finger contact must start as a light fingertip (depicted as a small disk), followed by a heavy fingertip (depicted as a larger disk), causing the finger contact to spread out over more of the touchscreen (as indicated by the depicted transition from a smaller disk to a larger disk), and/or occurring in total between 2.0 and 3.0 seconds.

Note that in one embodiment, table 400 is blocked from being presented on a touchscreen. Thus, a user must know how to touch the touchscreen and for how long based solely on the presentation/appearance of one or more of the icons shown in FIG. 4. However, since the user is able to set up the icon codes (e.g., in a setup screen on the electronic device, using drop-down or custom choices), then the user will know/remember the meaning of the icons.

In one embodiment, various combinations of the icons shown in table 400 can be used in a single set of visual cues. That is, rather than the legitimate visual cues all being of the same type of icon (as depicted in FIG. 3), in one embodiment a single set of visual cues can contain different icons, such that one tactile input from the single set of visual cues must be a fingernail, another tactile input from the single set of visual cues must be a vibrato fingertip, another tactile input from the single set of visual cues must be a side of a finger, etc. in order for the electronic device to accept the tactile input, and thus unlock itself.

Figure 5:
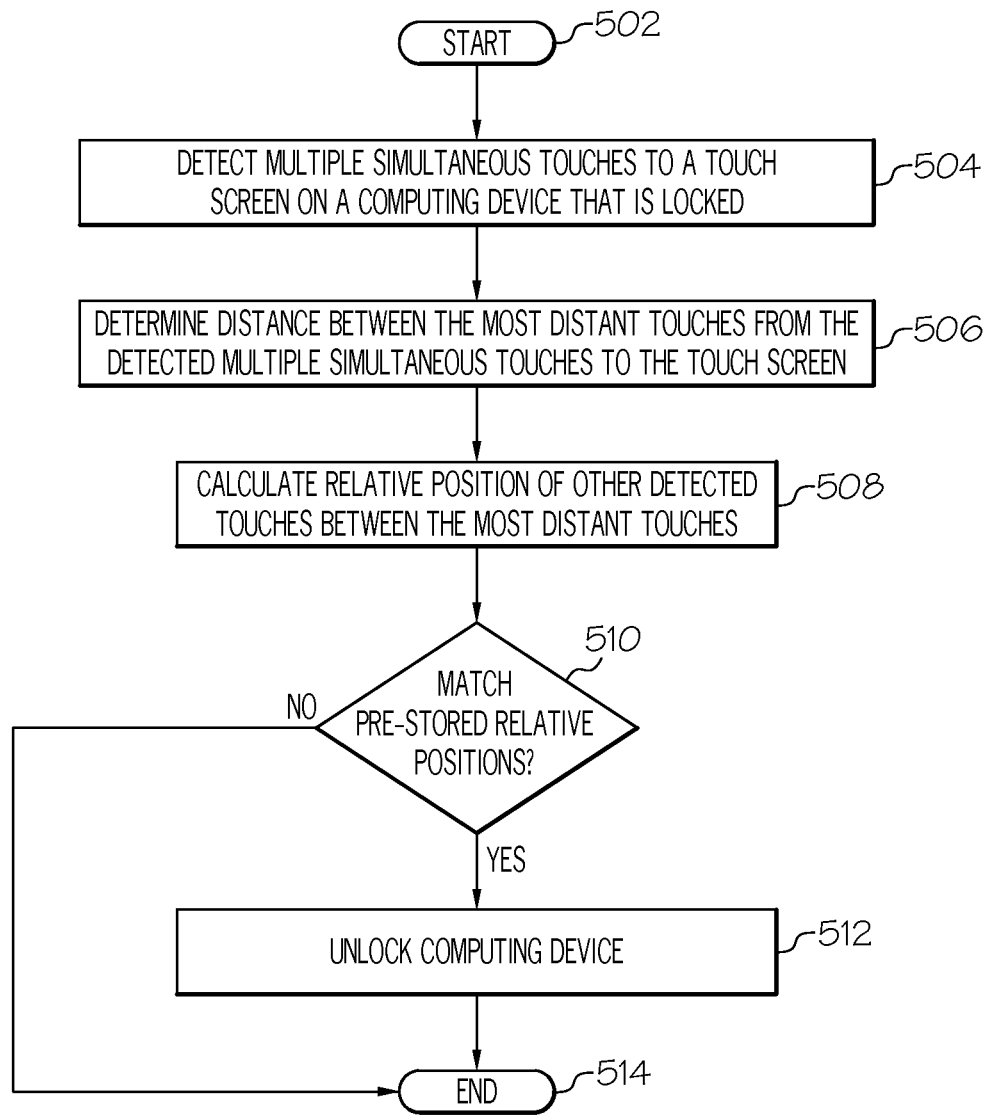
FIG. 5 is a high-level flowchart of one or more steps performed by one or more processors to unlock an electronic device using a touchscreen.

With reference now to FIG. 5, a high-level flowchart of one or more steps performed by one or more processors to unlock an electronic device using a touchscreen is presented. After initiator block 502, multiple simultaneous tactile inputs to a touchscreen on an electronic device are detected (block 504). The electronic device is initially in a locked state, such that it requires a user-provided unlock signal (e.g., to the touchscreen) before allowing any access to resources, data, etc. within the electronic device, and/or accepting any other inputs to the touchscreen. Examples of resources that are inaccessible while the touchscreen is locked include, but are not limited to, a browser (e.g., browser 146 shown in FIG. 1), a network interface (e.g., network interface 130 shown in FIG. 1), and/or a hard drive (e.g., hard drive 134 shown in FIG. 1) within the electronic device.

As described in block 506, a determination is made of the distance between the most distant tactile inputs from the detected multiple simultaneous tactile inputs to the touchscreen. As described herein, the most distant tactile inputs (e.g., tactile inputs 202a and 202d) are physically farther apart than any other two tactile inputs from the multiple simultaneous tactile inputs.

As described in block 508, the relative positions of other detected tactile inputs, as measured from the most distant tactile inputs, are then calculated. For example, the relative positions may be derived from a percentage of the distance between the two most distant tactile inputs.

As described in query block 510, a query is made to determine if the relative position of the other detected tactile inputs match a previously stored positioning file for touchscreen tactile inputs. If so, then the electronic device is unlocked (block 512) and the flowchart ends (terminator block 514). As described herein, the relative position of the other detected tactile inputs matches the stored positioning file for touchscreen tactile inputs independent of the distance between the most distant tactile inputs from the detected multiple simultaneous tactile inputs to the touchscreen. That is, it is not the absolute physical spacing between the tactile inputs that matters, but rather their relative distances according to the distance between the most distant tactile inputs. (See tactile input set 204 and tactile input set 206 in FIG. 2, which have matching tactile input patterns, even though the absolute distances between the tactile inputs are different.)

As described herein, in one embodiment of the present invention visual cues that match the most distant positions of the most distant tactile inputs and the relative position of the other detected tactile inputs are presented on the touchscreen. These visual cues are of a specific visual appearance, and touching them unlocks the electronic device. (See FIG. 3). As described herein, in one embodiment these visual cues are legitimate cues, such that touching them will unlock the electronic device.

As described herein, in one embodiment of the present invention visual misdirection cues are presented on the touchscreen. These visual misdirection cues, if touched by the user, will cause the electronic device to remain locked, even if they match the most distant positions of the most distant tactile inputs and the relative position the other detected tactile inputs. That is, the visual misdirection cues are of a specific visual appearance, but touching the visual misdirection cues keeps the electronic device in the locked state. In one embodiment, the visual misdirection cues are randomly placed on the touchscreen, while in another embodiment they are placed where the user set his splayed finger positions during the initial setup.

As described herein, in one embodiment of the present invention, the visual cues, which in one embodiment are placed on the touchscreen such that they match the most distant positions of the most distant tactile inputs and the relative position the other detected tactile inputs, are visually coded according to a type of finger contact (e.g., fingernail, finger roll, finger vibrato, etc.) that is required in order for the electronic device to accept a touch input at a position associated with a particular visual cue. In one embodiment, a legend describing how the finger contacts must be presented, in order to be accepted by the electronic device as an input, is blocked from being shown on the touchscreen.

As described herein, in one embodiment of the present invention, the visual cues, which in one embodiment are placed on the touchscreen such that they match the most distant positions of the most distant tactile inputs and the relative position of the other detected tactile inputs, are visually coded according to how long (i.e., a minimum and a maximum length of time) that is required in order for the electronic device to accept a touch input at a position associated with a particular visual cue. In one embodiment, a legend describing how long the finger contacts must be presented, in order to be accepted by the electronic device as an input, are blocked from being shown on the touchscreen.

Furthermore, in one embodiment of the present invention, unlocking the electronic device depends not only on where, how, and for how long fingers are placed on the touchscreen, but also on the physical orientation of the electronic device. For example, consider again the touchscreen 200 shown in FIG. 2. In one embodiment, the tactile input sets 204/206 are accepted by the electronic device (of which the touchscreen 200 is a component) only if the electronic device (and thus the touchscreen 200) is oriented in a "landscape" orientation (as depicted in FIG. 2). The electronic device is in "landscape" orientation if the wider side of the touchscreen 200 (i.e., the bottom edge of the touchscreen 200 shown in FIG. 2) is parallel to the ground/floor/etc. while being held by a user. The physical orientation of the electronic device is detected by accelerometers, gravity detecting scales, etc. (i.e., physical orientation sensors—such as the motion/orientation sensor(s) 154 depicted in FIG. 1) found within the electronic device.

However, in another embodiment, the tactile input sets 204/206 are accepted by the electronic device only if the electronic device (and thus the touchscreen 200) is oriented in a "portrait" orientation, such that the more narrow edge of the touchscreen 200 (i.e., the left or right edge of the touchscreen 200 depicted in FIG. 2) is parallel to the ground/floor/etc. while being held by a user.

In another embodiment, the electronic device must be shaken, wiggled, or otherwise moved according to a user-determined manner in order for tactile inputs to the touchscreen to be accepted by the electronic device (which is enabled with accelerometers, strain gauges, etc.—"motion detectors", such as the motion/orientation sensor(s) 154 depicted in FIG. 1). For example, in one embodiment the electronic device requires that it be shaken back and forth while the tactile inputs are being placed on the touchscreen. If the electronic device is not being shaken while the user is touching the touchscreen in the prescribed manner, then these touchings ("tactile inputs") will not be accepted by the electronic device.

As with other criteria required for inputting tactile inputs (e.g., where, how, and for how long fingers are placed on the touchscreen), the requisite orientation, movement, etc. of the electronic device in order for tactile inputs to be accepted are set by the user in one embodiment, such that the user will know/remember how to hold the electronic device.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for unlocking an electronic device that has a touchscreen, the method comprising:
    detecting, by one or more processors, multiple simultaneous tactile inputs to a touchscreen on an electronic device, wherein the electronic device is initially in a locked state, and wherein a locked electronic device requires a user-provided unlock signal before allowing access to resources within the electronic device;
    determining, by one or more processors, a distance between most distant tactile inputs from the detected multiple simultaneous tactile inputs to the touchscreen, wherein the most distant tactile inputs are physically farther apart than any other two tactile inputs from the multiple simultaneous tactile inputs;
    calculating, by one or more processors, a relative position of other detected tactile inputs from the multiple simultaneous tactile inputs as measured from the most distant tactile inputs; and
    in response to the relative position of the other detected tactile inputs matching a stored positioning file for touchscreen tactile inputs, unlocking, by one or more processors, the electronic device, wherein the relative position of the other detected tactile inputs matches the stored positioning file for touchscreen tactile inputs independent of the distance between the most distant tactile inputs from the detected multiple simultaneous tactile inputs to the touchscreen.

2. The method of claim 1, further comprising:
    calculating, by one or more processors, the relative position of the other detected tactile inputs based on a percentage of a distance between the most distant tactile inputs.

3. The method of claim 1, further comprising:
    presenting, by one or more processors, visual cues that match the most distant positions of the most distant tactile inputs and the relative position of the other detected tactile inputs, wherein the visual cues are of a specific visual appearance, and wherein touching the visual cues unlocks the electronic device.

4. The method of claim 1, further comprising:
    presenting, by one or more processors, visual misdirection cues that match the most distant positions of the most distant tactile inputs and the relative position of the other detected tactile inputs, wherein the visual misdirection cues are of a specific visual appearance, and wherein touching the visual misdirection cues keeps the electronic device in the locked state.

5. The method of claim 1, further comprising:
    presenting, by one or more processors, visual misdirection cues that are of a specific visual appearance, wherein touching the visual misdirection cues keeps the electronic device in the locked state.

6. The method of claim 1, further comprising:
    presenting, by one or more processors, visual cues that match the most distant positions of the most distant tactile inputs and the relative position of the other detected tactile inputs, wherein each of the visual cues are of a specific visual appearance, and wherein each of the visual cues is coded according to a type of finger contact that is required in order for the electronic device to accept a tactile input at a position associated with a particular visual cue.

7. The method of claim 6, further comprising:
    blocking, by one or more processors, a presentation of a legend for the visual cues on the touchscreen.

8. The method of claim 1, further comprising:
    presenting, by one or more processors, visual cues that match the most distant positions of the most distant tactile inputs and the relative position of the other detected tactile inputs, wherein each of the visual cues are of a specific visual appearance, and wherein each of the visual cues is coded according to a temporal length of finger contact that is required in order for the electronic device to accept a tactile input at a position associated with a particular visual cue.

9. The method of claim 8, further comprising:
    blocking, by one or more processors, a presentation of a legend for the visual cues on the touchscreen.

10. The method of claim 8, wherein the temporal length is between a minimum amount of time and a maximum amount of time that the finger contact is required to be made with the touchscreen.

11. The method of claim 1, wherein the touchscreen tactile inputs are not accepted by the electronic device unless the electronic device is in a predetermined physical orientation, the method further comprising:
    detecting, by one or more physical orientation sensors within the electronic device, a physical orientation of the electronic device; and
    in response to determining that the detected physical orientation of the electronic device does not match the predetermined physical orientation, blocking, by one or more processors, receipt of the touchscreen tactile inputs by the electronic device.

12. The method of claim 1, wherein the touchscreen tactile inputs are not accepted by the electronic device unless the electronic device is being physically shaken in a predetermined manner, the method further comprising:
    detecting, by one or more motion detectors within the electronic device, a physical shaking of the electronic device; and in response to determining that the detected physical shaking of the electronic device does not match the predetermined manner of being physically shaken, blocking receipt of the touchscreen tactile inputs by the electronic device.

13. A computer program product for unlocking an electronic device that has a touchscreen, wherein the computer program product comprises a non-transitory computer readable storage medium having program code embodied therewith, the program code readable and executable by a processor to perform a method comprising:
   detecting multiple simultaneous tactile inputs to a touchscreen on an electronic device, wherein the electronic device is initially in a locked state, and wherein a locked electronic device requires a user-provided unlock signal before accepting any other inputs to the touchscreen;
   determining a distance between most distant tactile inputs from the detected multiple simultaneous tactile inputs to the touchscreen, wherein the most distant tactile inputs are physically farther apart than any other two tactile inputs from the multiple simultaneous tactile inputs;
   calculating a relative position of other detected tactile inputs as measured from the most distant tactile inputs; and
   in response to the relative position of the other detected tactile inputs matching a stored positioning file for touchscreen tactile inputs, unlocking the electronic device, wherein the relative position of the other detected tactile inputs matches the stored positioning file for touchscreen tactile inputs independent of the distance between the most distant tactile inputs from the detected multiple simultaneous tactile inputs to the touchscreen.

14. The computer program product of claim 13, wherein the method further comprises:
   calculating the relative position of the other detected tactile inputs based on a percentage of a distance between the most distant tactile inputs.

15. The computer program product of claim 13, wherein the method further comprises:
   presenting visual cues that match the most distant positions of the most distant tactile inputs and the relative position of the other detected tactile inputs, wherein the visual cues are of a specific visual appearance, and wherein touching the visual cues unlocks the electronic device.

16. A system comprising:
   a processor, a computer readable memory, and a non-transitory computer readable storage medium;
   first program instructions to detect multiple simultaneous tactile inputs to a touchscreen on an electronic device, wherein the electronic device is initially in a locked state, and wherein a locked electronic device requires a user-provided unlock signal before accepting any other inputs to the touchscreen;
   second program instructions to determine a distance between most distant tactile inputs from the detected multiple simultaneous tactile inputs to the touchscreen, wherein the most distant tactile inputs are physically farther apart than any other two tactile inputs from the multiple simultaneous tactile inputs;
   third program instructions to calculate a relative position of other detected tactile inputs as measured from the most distant tactile inputs; and
   fourth program instructions to, in response to the relative position of the other detected tactile inputs matching a stored positioning file for touchscreen tactile inputs, unlock the electronic device, wherein the relative position of the other detected tactile inputs matches the stored positioning file for touchscreen tactile inputs independent of the distance between the most distant tactile inputs from the detected multiple simultaneous tactile inputs to the touchscreen; and wherein
the first, second, third, and fourth program instructions are stored on the non-transitory computer readable storage medium and executed by the processor via the computer readable memory.

17. The system of claim 16, further comprising:
   fifth program instructions to calculate the relative position of the other detected tactile inputs based on a percentage of a distance between the most distant tactile inputs; and wherein
the fifth program instructions are stored on the non-transitory computer readable storage medium and executed by the processor via the computer readable memory.

18. The system of claim 17, further comprising:
   fifth program instructions to present visual cues that match the most distant positions of the most distant tactile inputs and the relative position of the other detected tactile inputs, wherein the visual cues are of a specific visual appearance, and wherein touching the visual cues unlocks the electronic device; and wherein
the fifth program instructions are stored on the non-transitory computer readable storage medium and executed by the processor via the computer readable memory.

19. The system of claim 18, further comprising:
   fifth program instructions to present visual cues that match the most distant positions of the most distant tactile inputs and the relative position of the other detected tactile inputs, wherein each of the visual cues are of a specific visual appearance, and wherein each of the visual cues is coded according to a type of finger contact that is required in order for the electronic device to accept a tactile input at a position associated with a particular visual cue; and wherein
the fifth program instructions are stored on the non-transitory computer readable storage medium and executed by the processor via the computer readable memory.

20. The system of claim 18, further comprising:
   fifth program instructions to present visual cues that match the most distant positions of the most distant tactile inputs and the relative position of the other detected tactile inputs, wherein each of the visual cues are of a specific visual appearance, and wherein each of the visual cues is coded according to a temporal length of finger contact that is required in order for the electronic device to accept a tactile input at a position associated with a particular visual cue; and wherein
the fifth program instructions are stored on the non-transitory computer readable storage medium and executed by the processor via the computer readable memory.

* * * * *